Oct. 17, 1961   G. E. SNOEYENBOS ET AL   3,004,311
METHOD OF MAKING AND MOUNTING FOUNDRY PATTERNS

INVENTOR.S
GORDON E. SNOEYENBOS
GORDON W. JOHNSON
BY CORBETT MAHONEY
MILLER & RAMBO, ATTY'S

INVENTORS
GORDON E. SNOEYENBOS
GORDON W. JOHNSON
BY CORBETT MAHONEY
MILLER & RAMBO ATTYS

INVENTORS
GORDON E. SNOEYENBOS
GORDON W. JOHNSON
BY CORBETT MAHONEY
MILLER & RAMBO ATTY'S
BY Wm. V. Miller

*INVENTORS*
GORDON E. SNOEYENBOS
GORDON W. JOHNSON
BY
GORBETT MAHONEY
MILLER & RAMBO ATTYS

Oct. 17, 1961 G. E. SNOEYENBOS ET AL 3,004,311
METHOD OF MAKING AND MOUNTING FOUNDRY PATTERNS
Filed Jan. 21, 1959 7 Sheets-Sheet 5

*INVENTORS*
GORDON E. SNOEYENBOS
GORDON W. JOHNSON
*BY*
CORBETT MAHONEY
MILLER & RAMBO ATTYS
BY Wm. V. Miller Oct. 17, 1961 G. E. SNOEYENBOS ET AL 3,004,311
METHOD OF MAKING AND MOUNTING FOUNDRY PATTERNS
Filed Jan. 21, 1959 7 Sheets-Sheet 6
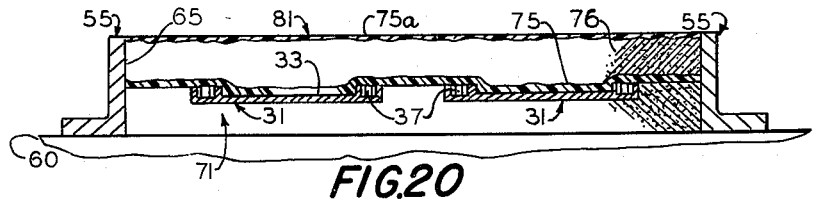
FIG.20
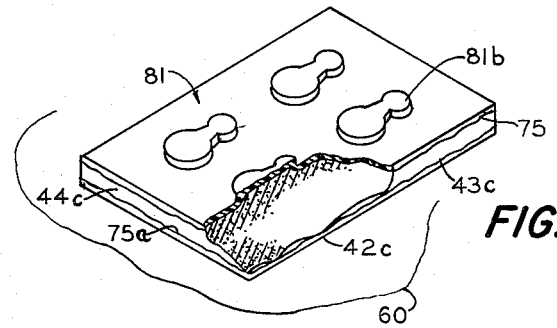
FIG.21
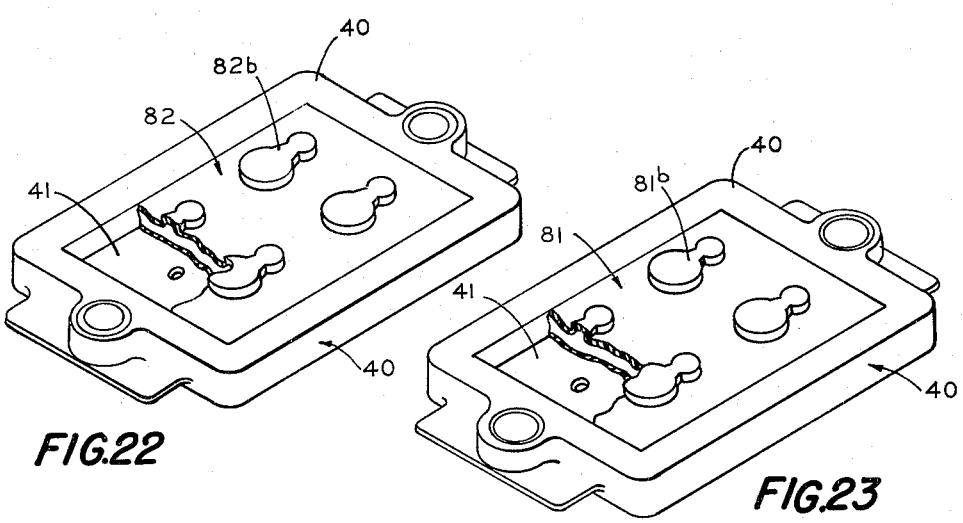
FIG.22
FIG.23
INVENTORS
GORDON E. SNOEYENBOS
GORDON W. JOHNSON
BY
CORBETT MAHONEY
MILLER & RAMBO ATTY'S.

3,004,311
METHOD OF MAKING AND MOUNTING FOUNDRY PATTERNS

Gordon E. Snoeyenbos, Decatur, Ill., and Gordon W. Johnson, Granville, Ohio, assignors to Malleable Research and Development Foundation, Granville, Ohio, a corporation of Ohio
Filed Jan. 21, 1959, Ser. No. 788,166
5 Claims. (Cl. 22—191)

This invention relates to a method of making and mounting foundry patterns. It relates, more particularly, to that type of production foundry patterns which are used in pairs and which consist of one pattern insert for use in the cope frame of a molding machine and another pattern insert for use in the drag frame of the molding machine. More specifically, it deals with the making of such production pattern inserts and to the mounting of such inserts in the mold frames.

Attempts have been made in the prior art to provide a simple cheap method for producing and mounting in the cope and drag mold frames, accurately laterally registered and properly vertically located matched pattern insert sections of articles having symmetrical or unsymmetrical contours with simple or complicated parting lines. These attempts have been directed at the great difficulty previously encountered in forming and accurately aligning laterally, as well as accurately vertically locating, the sections of the pattern or pattern inserts in order to produce satisfactory castings. They have included attempts to minimize the hand and machine work necessary to accurately form the pattern sections and to locate them accurately relative to each other and to the mold sections.

One prior art method, not widely followed in the industry but proposed, includes the formation of an accurately dimensioned frame to carry the pattern so that a series of these patterns can be mounted in a mold flask. The alleged purpose of the pattern-carrying frame is to insure accuracy as to length and width and to provide an indication as to the desired height. This pattern-carrying frame is used with another accurately dimensioned frame having similar external length and width to carry a mold having an impression of the pattern to be formed. The first or permanent pattern-carrying frame is superimposed on the second or mold-carrying frame and a third riser frame accurately formed to have similar external length and width dimensions is superimposed on the pattern-carrying frame. These frames must not only be precisely formed to predetermined dimensions but when superimposed, they must be accurately aligned horizontally by the use of an accurately formed right angle locating frame, in the angle of which the superimposed frames must be held during subsequent operations to keep them aligned. The riser or third frame along with the pattern-carrying or first frame and the cavity in the second or mold-carrying frame serve as a receptacle to receive the pattern-forming substance which is cast therein and, as indicated above, during this casting operation, the three superimposed frames must be maintained in accurate horizontal alignment by the use of the right angle locating frame. The riser frame provides means for obtaining the high head necessary in casting the pattern-forming material, which is usually a Cerro-alloy, in order to obtain a desired degree of density in the material of the pattern and for the material to intimately contact the interior surfaces of the frame. Also, the riser frame is adapted to overlie the inner wall of the pattern-carrying frame to establish a flange or point for dimension change of the pattern-forming substance cast into the superimposed frames. This flange or point serves as an indication for the amount of material to be removed by a subsequent machining operation to provide a pattern of the desired thickness carried by the permanent frame which is adapted to fit into the flask of a molding machine.

Thus, although this method strives for proper vertical location of pattern surfaces by superimposing the frames, it is still necessary to machine off the riser portion on the cast pattern in order to obtain accurate vertical registration in the molding machine. The vertical registration is not only dependent upon the accuracy of the vertical dimensions of the frames but also on the final machining operation to remove the riser portion from the pattern. Furthermore, although this method strives for horizontal or lateral registration, this registration is not only dependent on the accurate fabrication of the three frames used but also on the maintenance of these frames in accurate alignment by the right angle locating frame during the casting of the pattern, the locating frame also necessarily being of extreme accuracy. Also, although this method attempts to eliminate accurate machining operations previously required on pattern inserts, the effect is to transfer most of these machining operations to a frame which must be accurately formed and its four external vertical surfaces machined in order to provide accurate locating surfaces. In addition, the excess or riser material extending from the pattern-carrying frame must be machined off accurately to provide a vertical locating surface. Thus, machining is still required on five locating surfaces.

The main object of this invention is to provide a system for making and mounting foundry pattern inserts to be used in production, and especially that type of pattern inserts used in pairs consisting of one pattern insert for the cope frame and another for the drag frame of a molding machine, whereby the procedure followed in the industry for making production patterns from the master pattern is greatly simplified by eliminating time-consuming and expensive operations, such as the accurate fabrication of frames, machining, etc.

Another object of this invention is to provide such a system of forming pattern inserts which minimizes the probability of workmen's errors, since the system inherently provides for the precision forming of all the surfaces of the pattern inserts, exact duplication, horizontal or lateral registration, and proper vertical positioning of the various components of the finished pattern inserts, without requiring workmen to make precision measurements, thereby resulting in decreased costs.

Another object of this invention is to provide a system for forming pattern inserts whereby the resulting pattern inserts are provided with up to five locating surfaces of extreme accuracy which are produced without resorting to machining or measuring operations and which will cooperate with the corresponding surfaces in the cope and drag mold frames to accurately locate the pattern sections vertically and horizontally therein.

A further object of this invention is to provide a system for forming the pattern inserts without the use of expensive special equipment.

Still another object of this invention is to provide foundry pattern inserts which are of a standard form and size and which are so mounted in the cope and drag mold frames that they are interchangeable so that changes of pattern inserts can be made quickly to provide for the use of different pattern inserts sequentially without substantial loss of time for the changes.

Other objects of this invention will be apparent from the following description and the drawings which disclose preferred embodiments of this invention without limiting the scope of the invention as set forth in the claims.

According to this invention, individual pattern negatives are made from the master pattern in the usual manner to include mating cope and drag sections which can be properly aligned with each other by cooperating locating dowels and bushings positioned at the mating faces of the negative sections, and which are provided in the respective sections during the forming of such sections, at least two sets of these locating dowels and bushings being provided for accurate alignment of the mating negative sections. These negatives are then used, according to this invention, to form positive production pattern inserts which have precisely positioned locating surfaces that are used in accurately registering the cope and drag pattern inserts with each other and in accurately locating these pattern inserts in the receiving frames of a molding machine. Preferably, though not necessarily, there are five of these locating surfaces on each production pattern insert for cooperation with the corresponding surfaces of the pattern insert receiving pocket in the cope or drag mold frame. These locating surfaces, therefore, correspond to the four sides and the inner or bottom wall of the pocket. Although, standard cope and drag mold sections are made with pockets of this type, this invention contemplates the provision of a pattern insert with locating surfaces arranged the same as the corresponding surfaces of the receiving pocket, which usually would include at least two side walls at a fixed angle relative to each other, the side walls being disposed at a fixed angle relative to the bottom or inner wall of the pocket. In fact, if the pocket had a side wall of circular, elliptical, or arcuate form, the pattern insert could have a side or edge locating surface of annular or segmental extent at a predetermined angle relative to a plane or bottom locating surface, corresponding with the respective surfaces of the pattern-receiving pocket of the mold frame, as long as there was means for preventing shifting of the insert relative to the pocket in the plane of the insert. This invention provides for the precision forming of these angularly related locating surfaces without precision measurements, special expensive equipment, and time-consuming machining or other precision operations.

In the accompanying drawings, there are illustrated modes contemplated in carrying out this invention but it is to be understood that these are by way of example and not of limitation.

In these drawings:

FIGURE 20 is a view similar to FIGURE 18 showing the formation of the positive pattern insert for the cope mold frame.

FIGURE 21 is an isometric view of the cope positive pattern insert produced as in FIGURE 20.

FIGURE 22 is an isometric view, partly broken away, showing the cope positive pattern insert in the pocket of the cope mold frame.

FIGURE 23 is a view similar to FIGURE 22 but showing the drag positive pattern insert in the pocket of the drag mold frame.

This invention contemplates the production of a pattern insert that is complemental to the pocket provided in a mold frame or flask of a molding machine. The pattern inserts will be of a standard form for a certain type of molding machine and will be interchangeable in the pockets of the mold frames of such machine.

Each of the pattern inserts may include a single pattern or a series of individual patterns formed as a unitary pattern insert. Each of these pattern inserts, as previously indicated, will have locating surfaces formed thereon for cooperating with a mold frame to locate the insert in a definite predetermined position in the frame. The manner in which these pattern inserts may be formed will be understood by reference to the following description and the attached drawings.

Figure 1:
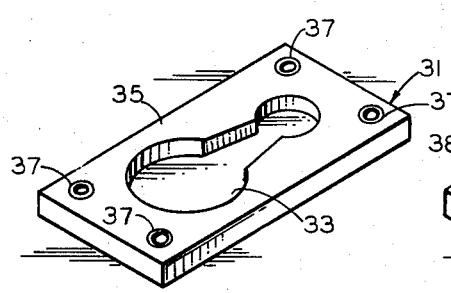
FIGURE 1 is an isometric view showing one section of a negative corresponding to half a master pattern.
Figure 2:
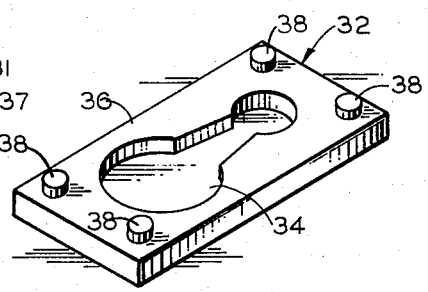
FIGURE 2 is a similar view showing the other mating section of the negative corresponding to the other half of the master pattern.

Individual pattern negatives are made from the master pattern by any of the usual procedures common in the art. These pattern negatives will consist of pairs of cooperating cope and drag sections, as illustrated in FIGURES 1 and 2, respectively, the cope section being designated by the numeral 31 and the drag section by the numeral 32. Each section 31 or 32 has a cavity formed by one half of the master pattern and these cavities are designated by the numerals 33 and 34, respectively. These negatives 31 and 32 are usually provided with the flat meeting faces 35 and 36, respectively, and at these respective faces the negative sections are provided with locating dowels and bushings, the bushings 37 being shown opening outwardly at the face 35 of the cope negative section 31 and the projecting portions of the dowels or pins being shown at 38 on the face 36 of the drag negative section 32. At least two sets of the locating dowels and bushings should be provided for aligning the mating sections 31 and 32 when they are superimposed with their faces 35 and 36 in flat contact.

Figure 3:
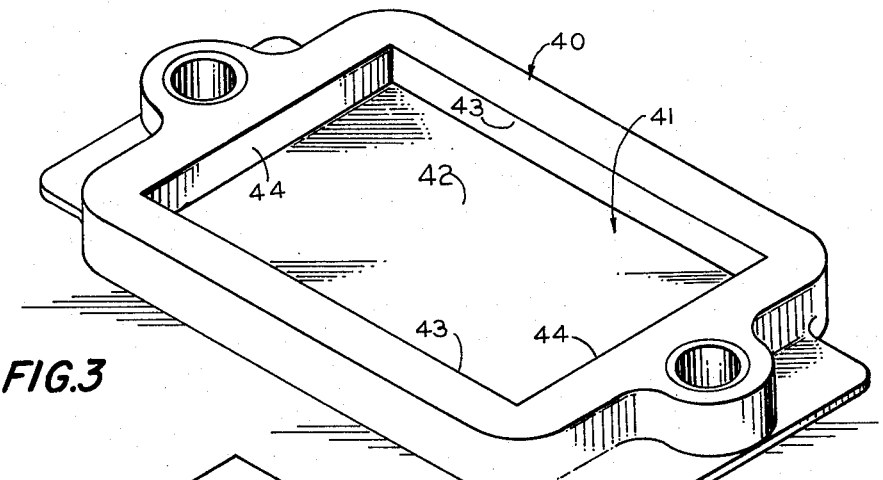
FIGURE 3 is an isometric view showing a mold frame or flask having a pocket for receiving a pattern insert formed in accordance with this invention.

The pattern insert produced according to this invention may be used with a mold frame 40 of the type shown in FIGURE 3. This mold frame shown may represent the cope or drag frame of the molding machine, since they are practically identical and are suitably mounted on the molding machine. This frame 40 is shown as having a pattern insert receiving pocket 41 formed therein and which is of rectangular form, the pocket having the inner flat wall or bottom plane surface 42, the long side surfaces 43 and the shorter side surfaces or ends 44. The side surfaces 43 and 44 are all arranged at right angles to each other and extend outwardly at right angles or normal to the plane surface 42. Thus, if a pattern insert is to be made which is to be complemental to the receiving pocket 41, it must have five locating surfaces for cooperation with the respective side surfaces 43 and 44 and the plane bottom surface 42 arranged in the same angular relationship.

Figure 4:
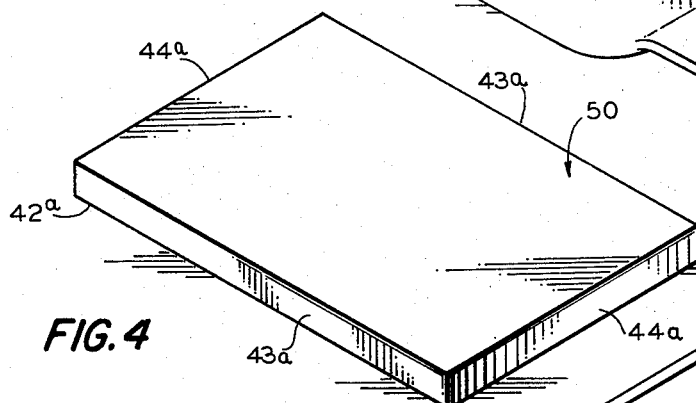
FIGURE 4 is an isometric view of a template which is complemental to the pattern-insert receiving pocket of the mold frame of FIGURE 3.

To make a pattern insert complemental to the pocket 42, the template 50 shown in FIGURE 4 preferably is first formed. This template 50 is formed of a predetermined size and outline and preferably of a predetermined thickness so that it will be complemental to the pocket 42. It may be formed by direct measurements or it may be actually cast in the pocket 42 and the latter method is more simple and accurate and, therefore, preferred. The template can be formed of any suitable material but is preferably cast in the pocket 42 of material which will not adhere to the metal of the frame 40 and which will have negligible shrinkage upon solidification in the pocket. This material may be a thermosetting resin of the non-shrinking, non-deforming type which is castable without heat or pressure and it has been found in actual practice that resins of the epoxy type are most suitable. However, other nonshrinking castable materials such as plaster, cement, low-melting point metals such as Woods metal, Cerro metal, etc., may be used.

The template 50 produced in this manner will have the locating side or edge surfaces 43a and 44a at right angles to each other and the locating plane surface 42a at right angles thereto. These locating surfaces correspond to the surfaces 43, 44 and 42, respectively, of the mold frame pocket 41.

Figure 5:
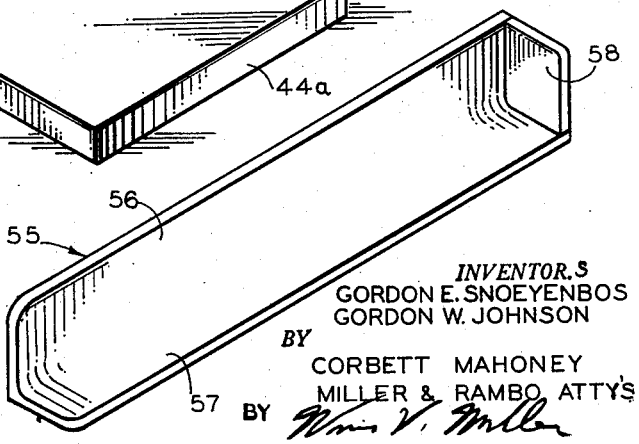
FIGURE 5 is an isometric view of one of the material-confining frame members used in forming the pattern insert in accordance with this invention.

The template 50 is then surrounded with suitable removable frame members 55 of the type indicated in FIGURE 5. Each of these frame members is elongated and mainly in the form of an angle member comprising the elongated flanges 56 and 57 disposed at right angles to each other. An end wall 58 is provided in the included angle at one end of the frame member 55 and is at right angles to the flanges 56 and 57. Thus, there is provided a frame member 55 having squared bottom, side and end walls. Depending upon the side or end at which each frame member 55 is disposed relative to the template 50, either of the flanges 56 or 57 may be used as the bottom on which the frame member rests or as the upstanding side wall. The outer surfaces of the walls 56, 57 and 58 are plane smooth surfaces. The frame members 55 may be formed of various materials but are preferably of metal. In some instances, as will be explained later, it may be desirable to have each of the flanges 56 and 57 of the frame members 55 of a width or height that is twice the thickness of the template 50.

Figure 6:
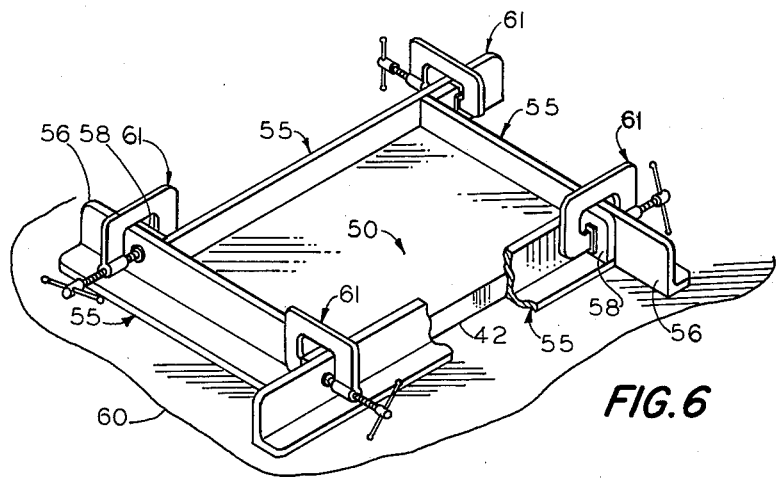
FIGURE 6 is an isometric view showing the template of FIGURE 4 surrounded with four of the frame members.

The manner in which the template 50 is surrounded with the frame members 55 is illustrated in FIGURE 6. The template 50 is placed with its plane surface 42 resting on a level flat plane horizontal supporting surface 60. It is surrounded with the frame members 55 so that its edges are firmly engaged by such frame members. Then by suitable clamps 61, located at each corner and clamping together the cooperating end and side walls 58 and 56, respectively, of adjacent frame members 55, the frame members are clamped in this surrounding relationship to the template 50.

Figure 7:
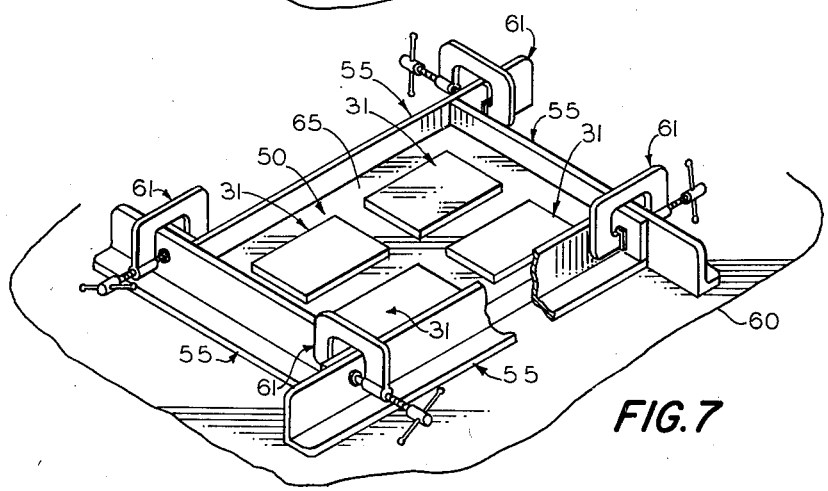
FIGURE 7 is a view similar to FIGURE 6 showing inverted cope negative sections positioned on the upper surface of the template within the frame members.
Figure 8:
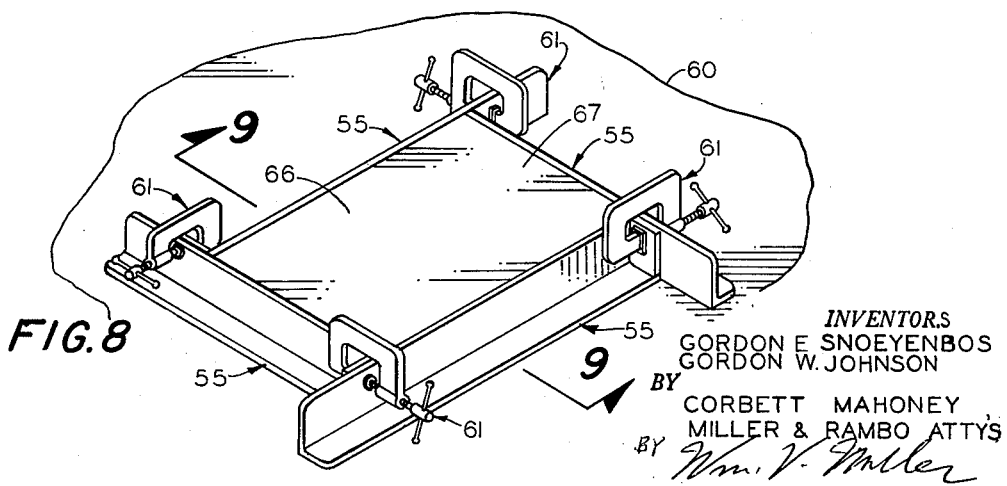
FIGURE 8 is a view similar to FIGURE 7 but showing the cavity provided by the frame members filled with a castable material.
Figure 9:
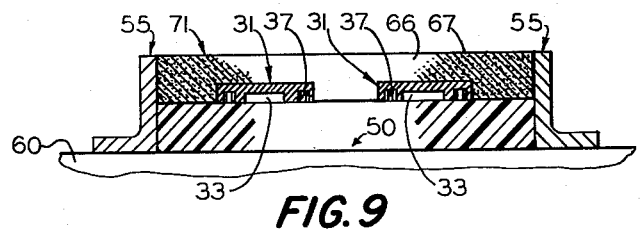
FIGURE 9 is a transverse sectional view taken along line 9—9 of FIGURE 8.

Next, negative sections of the master pattern or patterns to be reproduced are mounted on the template 50 as shown in FIGURE 7. Four of these sections are shown but it is to be understood that one section or any number may be used depending upon the size of each negative section. The negative sections are indicated as the cope sections 31 which are inverted and positioned on the upper plane surface of the template 50 but it is not important which sections are used first and they may be the drag negative sections 32 but they should be the sections with the bushings 37. The inverted negative sections 31 are positioned relatively, as desired, preferably in spaced relationship, on the surface of the template 50 and the remaining volume of the cavity 65, provided by the assembled frame members 55, is then filled with a non-shrinkable casting material 66 which will not adhere to the negative sections 31, the frame members 55, nor the template 50. This castable material may be plastic, plaster, cement, low-melting temperature metals and alloys, such as Woods metal, Cerro metal, etc. or similar materials having negligible shrinkage upon solidification. This cast material 66 is struck-off flush with the upper edges of the frame members 55, as indicated in FIGURES 8 and 9, to provide the flat plane surface 67. The frame members 55 for this operation are selected to give sufficient depth for the formation of the unit 71 (FIGURE 9) which will depend somewhat on the nature of the master pattern.

Figure 10:
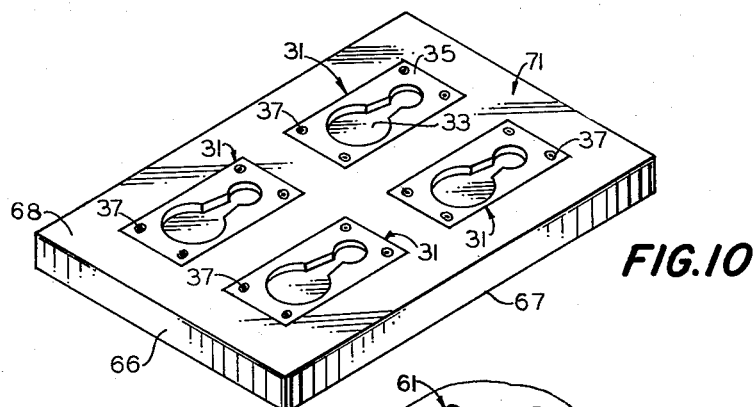
FIGURE 10 is an isometric view showing the negative unit or assembly of the cope negative sections of the master pattern formed as in FIGURES 8 and 9.

Thus, there will be produced an assembled negative or negative unit 71 (FIGURES 9 and 10) which will include the negative sections 31 plus the body material 66 or a single negative section plus the body material 66. This material may be termed a back-up or bonding material. The frame members 55 are disassembled and removed from around the negative assembly 71 and the template 50. The negative assembly 71, when inverted, will appear as in FIGURE 10. This negative assembly 71 will have the cavities 33 of the negative sections 31 opening upwardly with the bushings 37 thereof opening upwardly at the upper face 68 and will have a peripheral frame-locating edge with its ends and side portions at right angles to each other and with the edge normal to the plane surface 67.

Figure 11:
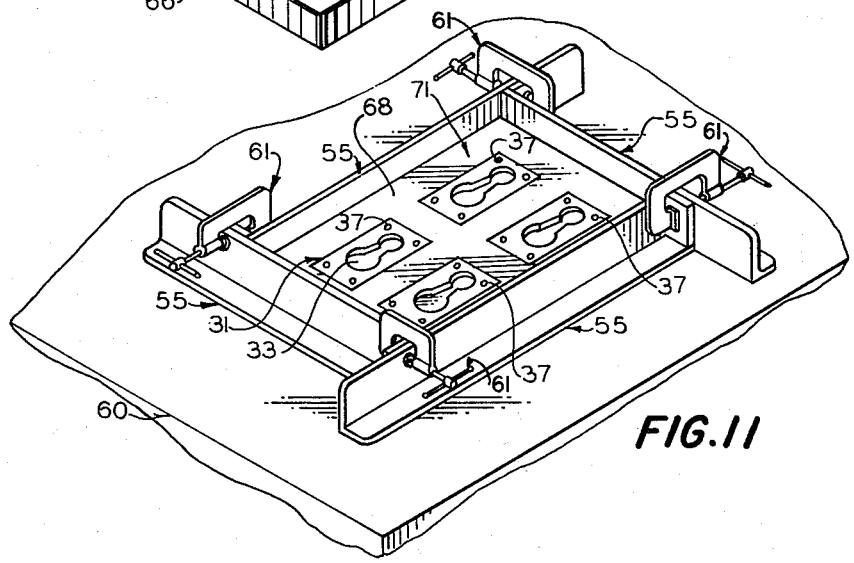
FIGURE 11 is an isometric view showing the inverted negative assembly surrounded by the frame members.

The inverted negative assembly or unit 71 is now used, along with the removable frame members 55, in forming the second negative assembly or unit which will be the drag assembly if the first negative assembly 71 is the cope assembly as described. In forming the second negative assembly, the inverted assembly 71 is positioned on the flat supporting surface 60 and the frame members 55 are clamped around the assembly 71 in the same manner they were clamped around the template 50, as shown in FIGURE 11, but in this step the frame members are located by the edge of the assembly 71. The individual negative sections from the opposite side of the master patterns, in this instance, the drag sections 32, are now inverted and mounted on the exposed or upper surface of the assembly 71, as shown in FIGURE 12.

Figure 12:
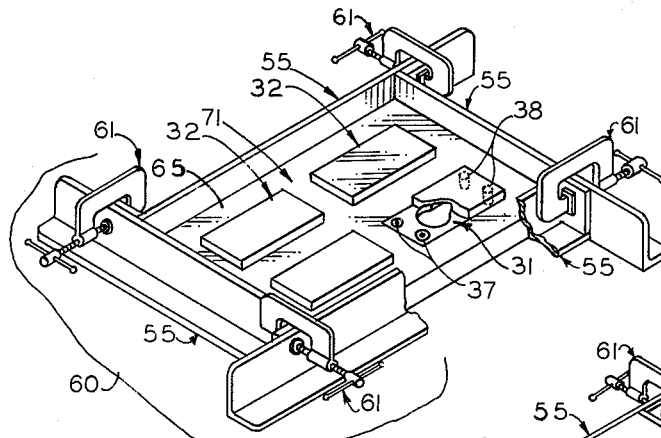
FIGURE 12 is a view similar to FIGURE 11 but showing inverted individual drag negative sections positioned on the frame enclosed negative assembly of FIGURE 11.
Figure 13:
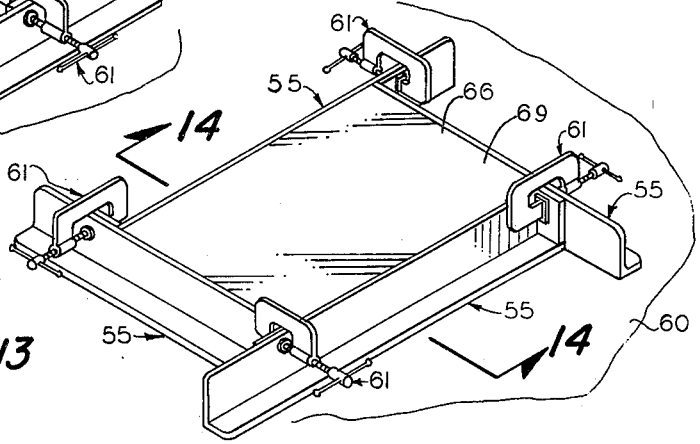
FIGURE 13 is a view similar to FIGURE 12 but showing the cavity within the frame members filled with a castable material.
Figure 14:
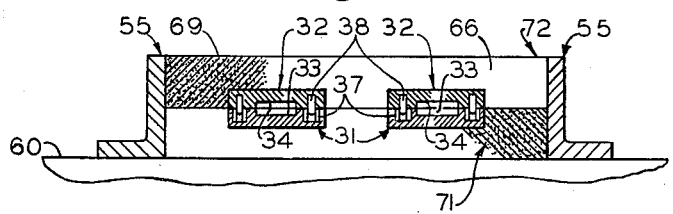
FIGURE 14 is a transverse sectional view taken along line 14—14 of FIGURE 13.
Figure 15:
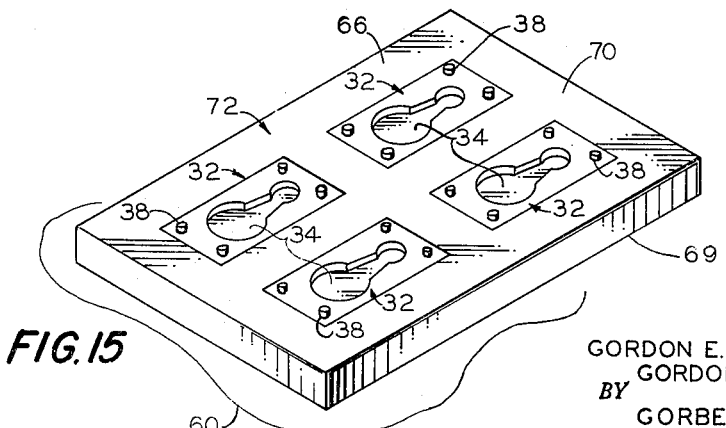
FIGURE 15 is an isometric view of the drag negative assembly of the drag negative sections of the master pattern formed as in FIGURES 12 to 14.

In positioning the individual inverted negative sections 32 on the negative assembly or unit 71 as shown in FIGURE 12, the pins 38 are slipped downwardly into the upwardly opening bushings 37 of the assembly 71. This will properly locate the downwardly opening cavities 34 of the negative sections 32 in registry with the upwardly opening cavities 33 of the assembled negative sections 31. Then, the remaining volume of the frame enclosed cavity 65 is again filled with the castable material 66 which is struck-off at the upper edges of the frame members 55 to form the flat top or exposed surface 69, as shown in FIGURES 13 and 14. If the frame members 55 are now removed, the drag negative unit or assembly 72 may be lifted from the cope negative unit or assembly 71 and will appear as in FIGURE 15 where it is shown inverted to expose the face 70 at which the cavities 34 open. The assembly or unit 72, as shown in FIGURE 15 will include the individual negative sections 32, joined by the castable joining and body material 66 and will have a peripheral frame-locating edge with its ends and side portions at right angles to each other and with the edge normal to the plane surface 69. If the original frame members 55 are not of sufficient depth to form the negative assembly or unit 72, deeper frame members can be used or the original frame members 55 can be blocked up as long as their lower edges are at a level where they engage the edges of the negative assembly 71 during the operation shown in FIGURES 12 and 13.

Figure 16:
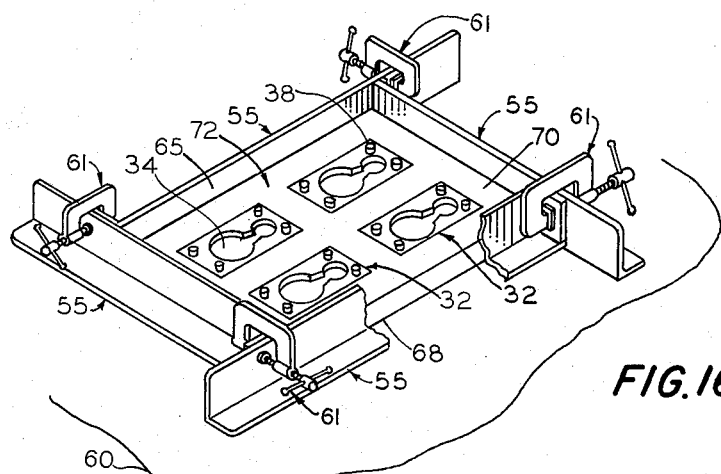
FIGURE 16 is an isometric view showing the drag negative assembly of FIGURE 15 enclosed within the frame members preparatory to making the positive pattern insert for the drag mold frame.

The negative assembly or unit 72 is now used in forming the positive pattern insert, which, in this case, will be the insert for the pocket 41 of the drag mold frame 40. The inverted negative assembly 72 is positioned on the flat supporting surface 60 with its struck-off flat surface 68 resting thereon and is surrounded by the removable frame members 55, as shown in FIGURE 16, which are clamped against the locating edge thereof. The upwardly projecting portions of the pins 38 at the face 70 of the assembly 72 are removed flush with that face by cutting them off or the pins may be withdrawn and the remaining holes filled flush with a suitable material. The frame cavity 65 is now filled with back-up or bonding material that is accurately leveled with the upper edges of the frame members 55, to form the positive insert 82 (FIGURE 19) which will not only have the proper locating peripheral edge surfaces, formed by the frame members, and the flat plane locating surface at its leveled-off upper side, but will also be of proper thickness to fit flush in the frame pocket 41.

Figure 17:
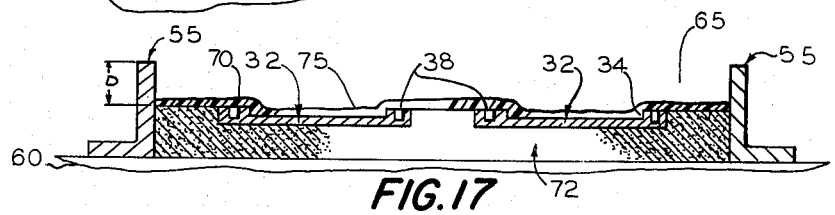
FIGURE 17 is a transverse sectional view of the assembly of FIGURE 16 showing the initial layer or deposit which forms the face of the pattern insert.

The positive insert 82 should include a body or back-up plate that in thickness corresponds to the depth of the pocket 41. Therefore, in casting the positive insert 82 on the negative assembly 72, as illustrated in FIGURE 17, it is desirable that the distance between the exposed face or now upper surface 70 of the assembly 72 and the upper edges of the associated removable frame members 55, indicated at D in FIGURES 17 and 18, be the same as the thickness of the template 50, which corresponds to the depth of the pocket 41 in the frame 40, so that the body or back-up plate of the finished positive insert 82 will fit flush in the pocket but will have embossed pattern portions 82b projecting from the outer surface of the body. This may be accomplished by using frame members 55 of proper height in the positive-forming operation, shown in FIGURES 17 and 18, and these may be of different height than the similar frame members used in the negative forming operations previously described, or it may be accomplished by blocking up the negative assembly 72 in the enclosing frame members 55 so that the distance D does correspond to the depth of the mold frame pocket 41. If the master pattern is sufficiently shallow, this may also be accomplished by having the original frame members 55 twice the height of the thickness of the template 50. Then each of the negative assemblies or units 71 and 72 will automatically be of the same thickness as the template 50 if the same depth or height frame members are used in all the operations, and, furthermore, the positive unit 82 will automatically be of the same thickness if these same frame members 55 are used in the positive-forming operation. As pointed out above, the materials used in the negative-forming and positive-forming operations will preferably be of such a nature that they will not adhere to associated members, but parting compounds may be used if necessary.

As indicated previously, it is preferred to use a thermosetting resin as the material for forming the pattern insert but this resin may only be at the exposed face of the insert and the body or back-up portion of the insert can be formed of other material. Therefore, the upper exposed surface of the negative assembly is first provided with a layer or coating 75 of this resin, which is shown in FIGURE 17, and which may be poured, sprayed, deposited, or otherwise formed at this surface. Then, the remainder of the frame-enclosed cavity 65 is preferably filled with a non-shrinkable castable material 76 which series as back-up material for the layer 75. This back-up material may be struck-off at the upper edge of the frame members 55 to form the exposed upper plane locating surface 42b. However, it is preferable that this surface 42b be provided by almost filling the cavity 65 with back-up material and then forming the final surface with resin in liquid form which is poured through an opening in a glass plate 60a resting on the upper edges of the frame members 55 to provide a final surface layer 75a. The back-up material is not only non-shrinkable but will fuse to the layer 75, without adhering to the frame members 55, and provide a nondeformable unit 82. In actual practice, it has been found that the best thermosetting resin which can be used to form the surface layer or coating 75 is of the epoxy type and epoxy resins have actually been used successfully. Also, in actual practice it has been found that a suitable back-up material is the same type resin, in which is mixed granular aluminum material. The grains of aluminum have been mixed with the epoxy resin in liquid form and a hardener added before forming the material. Then as the resin hardened, it adhered to the surface layer 75 as it simultaneously hardened. The layer 75a may be of any suitable type that can be poured in its uncured state but need not have the impact and wear resistance of the layer 75 but it is preferably of the same material. Since the resin material in the filler or back-up layer and the resin in the surface layers 75 and 75a are preferably of the same type, they, upon curing, provide an integral positive unit 82. As pointed out above, the thermosetting resin used in non-shrinkable and will not adhere to the frame members 25 or the assembly 72, although parting compounds may be used. When the cast material sets or cures, the drag positive insert 82 is completed. The back-up material 76 provides a material which can be tapped and threaded more effectively than a body formed solely of plastic material and which will have other desirable properties.

Figure 18:
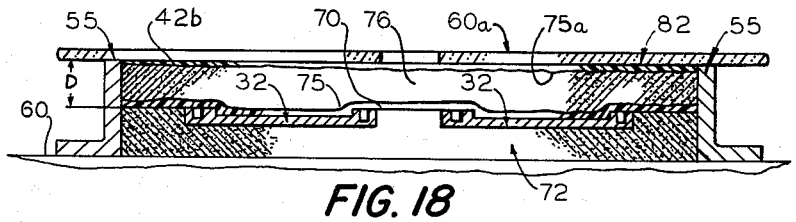
FIGURE 18 is a view similar to FIGURE 17 but showing the frame cavity filled with non-shrinkable castable filler or back-up material.
Figure 19:
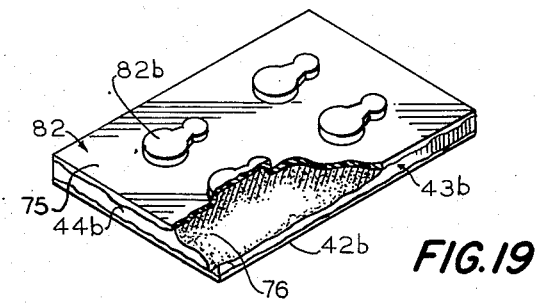
FIGURE 19 is an isometric view showing the drag positive pattern insert, produced as in FIGURE 18, inverted after removal of the frame members.

Now it is merely necessary to remove the plate 60a and the frame members 55 and lift the drag positive insert 82 from the negative assembly or unit 72. This insert 82 is shown inverted in FIGURE 19 from the position in which it is formed in FIGURE 18. The positive pattern insert 82 will have a body or back-up plate which will be of proper outline and thickness to fit into the pocket 41 in the drag mold frame 40, shown in FIGURE 22, and will have the embossed pattern portions 82b on its exposed face. This insert member 82, as shown in FIGURE 19, will have the plane locating surface 42b thereon, and the locating side or edge surfaces 43b and 44b which correspond to the pocket surfaces 42, 43, and 44, respectively, previously mentioned.

The negative assembly or unit 71 will be used in a similar manner in producing the cope positive insert 81, as shown in FIGURE 20, by filling the frame cavity 65, formed by the frame members 55 which surround it and engage the locating edge thereof, with the non-shrinkable cast material. Before this casting operation, the upwardly opening bushings 37 at the exposed upper face of the assembly 71 are filled with suitable material flush with the face. When the cope positive insert 81 has the frame members 55 removed therefrom and is inverted, it will appear as shown in FIGURE 21. It will have the plane locating surface 42c, and the edge or side locating surfaces 43c and 44c, for cooperating with the corresponding surfaces 42, 43, and 44 of the pocket 41 formed in cope mold frame 40 shown in FIGURE 23. This positive insert will include the body or back-up plate, equal in thickness to the depth of the pocket 41, that will have the embossed pattern portions 81b on its exposed face.

The positive patterns 81 and 82, mounted in the pockets 41 of the cope and drag frames 40, as shown in FIGURES 22 and 23, will provide production patterns useful in the usual manner on molding machines which carry the cope and drag frames. Each insert will snugly fit in its pocket 41 and, therefore, will be located properly laterally of the pocket 41 as well as located properly relative to the depth of the pocket. Therefore, when they are used in forming the cope and drag said mold sections, proper horizontal registration and relative vertical positioning will result. All pattern inserts, according to this invention, will be of standard size and will be interchangeable readily. The mounting or interchange of pattern inserts relative to the mold frames can be made quickly and without danger of error in registry of cope and drag sections carried by opposed mold frames. The positive pattern inserts may be secured in the pockets 41 of the mold frames 40, by suitable fastening members, for example, by bolts threaded into the back-up material 76, by magnetic means, suction cups, etc.

Although, in the procedure described above, it is preferred that the template 50 be of the same thickness as the depth of the pocket 41, this is not essential. The template may be of any thickness and in all cases it is not necessary that the body or back-up plate of the insert have its outer face flush with the adjacent face surfaces of the mold frame. In fact, the flush relationship of mold frame and insert can be obtained by proper relative blocking of the negative assembly and surrounding frame members, or selection of frame members of necessary height, for the positive casting operation to obtain a positive insert of desired thickness. In other words, regardless of how the correct distance D of FIGURES 17 and 18 is obtained, the resulting cast positive insert will be of the correct thickness.

The procedure described above, although preferred, may be further modified by removing the template 50 after it is used in initially locating the frame members, that is, after the step shown in FIGURE 6. Then, in the step shown in FIGURE 7 the negative sections 31 would be placed directly on the supporting surface 60 for the negative assembly casting operation of FIGURES 6 and 7. Then, in the next negative assembly casting operation illustrated in FIGURES 11 to 14, higher frame members are employed. The correct thickness of positive insert would then be obtained by selection of frame members of proper height, relative blocking of frame members, and enclosed negative assembly, as indicated above for the operations illustrated in FIGURES 16 to 21.

The template 50 could be dispensed with altogether although its use greatly simplifies the procedure and results in greater accuracy. For example, in the positioning of the frames 55 shown in FIGURE 6 instead of using the template 50, accurate measuring could be resorted to although this would not be as foolproof and effective as the use of a template.

In FIGURES 24 to 27, there is illustrated another modification of the procedure of producing the positive pattern inserts according to this invention. In this procedure, frame members 55c are provided which are of proper lengths to form the desired rectangle or square and are twice the height of the template 50c which corresponds in thickness to the depth of the pocket 41 in the mold frame 40 to receive the pattern insert. According to this modification, the removable frame members 55c, provided around the template 50c, are actually bolted to the template by means of bolt members 61c which pass through the frame members and are threaded into the edge of the template. The template 50c and the attached frame members 55c are positioned on the flat horizontal supporting surface 60, as before. Then, the individual drag negatives 32c, which in this instance have the bushings 37c, are positioned on the template 50c as before. The frame-formed cavity is then filled with the castable non-shrinkable material 66, as before, and is struck-off level. Before filling the cavity with the material 66, other bolts 61c are passed through the frame members 55c into the cavity above the template 50c. These bolts will have their inner ends embedded in the cast material 66.

Figure 24:
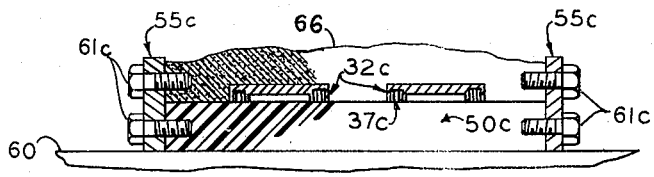
FIGURE 24 is a transverse sectional view through a material-confining frame and associated template in which a drag negative assembly has been formed according to a modification of this invention.
Figure 25:
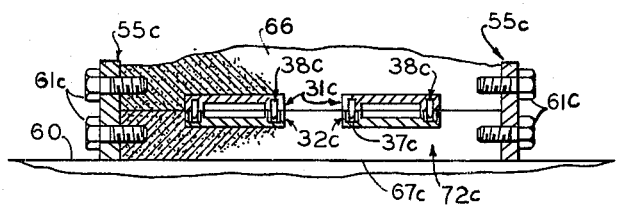
FIGURE 25 is a view similar to FIGURE 24 but showing the template removed from the frame and the cope negative assembly being formed on the previously formed drag negative assembly.

After the cast material 66 sets, the assembly of FIGURE 24 is inverted and is positioned on the surface 60 with the assembled negative unit 72c, so produced, resting on the flat surface 60, the struck-off surface 67c thereof being in flat contact with the supporting surface 60. Then, the template 50c is removed, by removing the cooperating bolts 61c. This will leave the assembly or unit 72c enclosed within the frame members 55c. Next, the cope negative assembly is formed by filling the cavity space above the negative unit 72c which was previously occupied by the template 50c. The individual cope negatives 31c are first positioned on the assembled negative sections 32c, being aligned therewith by the pins 38c carried thereby which fit into the bushings 37c of the sections 32c, as in the previously described procedure. Then, the frame cavity is filled with the castable non-shrinkable material 66, the bolts 61c, previously used for holding the template 50c in place now being inserted so that their inner threaded ends will be embedded in the material 66. The material 66 is struck-off to form a plane surface level with the top of the frame members 55c. This produces the cope negative assembly or unit 71c shown in FIGURE 27. One of the negative assemblies 71c or 72c is removed from the frame members 55c, by removing its cooperating bolts, and identical removable frame members are bolted to the other negative assembly with the same bolts, the exposed peripheral edge of the assembly properly locating such frame members. Then, the positive 81c or 82c of each of these assemblies is produced by casting insert forming material in the cavity remaining within the frame above each assembly.

Figure 26:
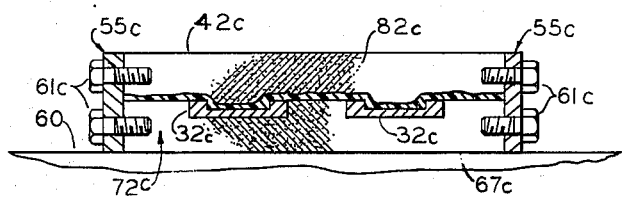
FIGURE 26 is a transverse sectional view showing the formation of the drag positive pattern insert on the drag negative assembly produced as in FIGURE 24.
Figure 27:
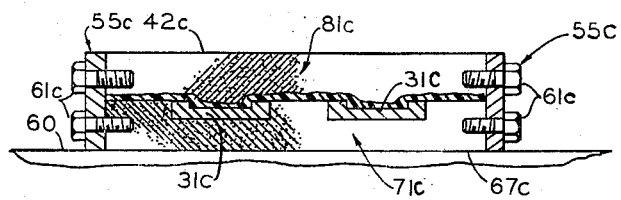
FIGURE 27 is a view similar to FIGURE 26 but showing the formation of the cope positive pattern insert on the cope negative produced as in FIGURE 25.

Thus, as shown in FIGURE 26, the positive drag pattern insert 82c is formed by filling the cavity over the negative assembly 72c and striking it off flush with the upper edges of the frame members 55c, or by following the procedure described with reference to FIGURE 18 to obtain a smooth surface. During this final casting operation, the bolt holes resulting from removal of the upper bolts 61c are filled flush with the inner surfaces of the removable frame members 55c. Similarly, the negative 81c is formed by casting the material on the negative assembly 71c and striking it off flush with the other edges of the frame members 55c. When the cast material sufficiently hardens, sets or cures, the positive inserts 81c and 82c can be removed. This cast material may be the same as that previously referred to and may consist of different facing and back-up materials. Prior to the casting of this material, the negative bushings and pins are treated as before.

Each positive insert will be of the desired precise thickness, as determined by the thickness of the template 50c in association with the removable frame members 55c which are in height twice the template thickness. Furthermore, each pattern insert will have five locating surfaces corresponding to the struck-off surface 42c and the four edge surfaces formed by the frame members 55c. These pattern inserts 81c and 82c will function in substantially the same manner and will have substantially the same advantages as the inserts 81 and 82 formed according to the procedure first described.

According to this latter procedure, the thickness of the negative is not relied upon to determine the thickness of the body or back-up plate of the positive insert. Each negative unit or assembly will automatically be of a thickness corresponding to that of the template and each positive insert cast on the negative assembly will be of the same thickness because of the use of the frames which are twice the height of the thickness of the template.

It will be apparent from the above that this invention contemplates the casting or otherwise forming of production patterns or pattern inserts having reference points in the form of locating surfaces in predetermined relationship for directly engaging and cooperating with complemental identically arranged reference points in the form of locating surfaces on a mold or mold frame to properly locate the pattern or insert on the mold or mold frame in the plane of the pattern as well as normal to its plane. It is preferable that the pattern insert be provided with five locating surfaces, namely a plane surface having four edge surfaces normal thereto and at right angles to each other for cooperating with an enclosed mold frame pocket having an inner plane wall and side walls at right angles thereto. Also, it is preferred that the pocket and the insert be of rectangular form so that the insert will always be inserted in the pocket in a predetermined relationship thereto and there will be no relative shifting in the plane of the insert. However, other arrangements may be provided but the locating surfaces on the pattern must include an edge locating surface, either angular or arcuate, for bearing against a cooperating complemental side wall surface on the mold or mold frame, against which it may be held in a suitable manner to determine its position in its own plane, and a bearing surface in a predetermined relationship to the edge surface, usually a plane bearing surface, which will cooperate with a complemental bearing surface on the mold or mold frame, against which it may be suitably held to determine the position of the pattern relative to the mold or frame in a direction normal to the plane of the pattern.

With patterns or pattern inserts having the above-stated characteristics it is possible to obtain accurate lateral or horizontal registration of the cope and drag sections or pairs of the pattern and the mold sections produced therewith as well as proper relative vertical positioning thereof. In casting these patterns or inserts, accurate frame dimensions for confining the cast material are essential to obtain accurate registration of the cope and drag pattern sections cast in the frames. Such accurate frame dimensions can be obtained by measurements but it is preferred to use the more simple, accurate and foolproof method described herein, where a template is employed and the frame members are positioned around its edges. It is preferable that a three-dimensional template be used but it is possible to use a two-dimensional template in which the thickness is not a factor. However, the use of the three-dimensional template with the thickness of the template the same as that of the pattern insert to be formed and one-half the height of the frame members, provides a simple, accurate arrangement for ease in obtaining inserts of precise thickness. In the casting operations, to form the negative units or assemblies, a two-dimensional template could be used as indicated to locate the frame members and the template could be removed from frame members, before casting, and frame members of a proper height to obtain an insert of desired height could be employed or relative blocking of frames and enclosed members could be employed. Thus, there are possible variations of the procedures outlined herein for obtaining registry of the cope and drag pattern sections and also for obtaining inserts of the desired overall size, outline, and thickness but the procedures specifically described herein are preferable.

Although examples of simple procedures for forming the patterns or pattern inserts have been described above, it should be understood that other procedures may be used according to this invention to both achieve and maintain cope to drag registration and accurate sizing of the pattern insert in regard to the plane or area of the pattern as well as in regard to its thickness.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A process for making a production pattern from a master pattern which comprises forming cope and drag negative sections with mating faces from the master pattern, enclosing one of said negative sections within a removable frame of predetermined size and outline in engagement with a locating surface with the mating surface of the negative section in contact with the inner wall of a material-receiving cavity formed by said frame in cooperation with said surface, casting back-up material in the frame cavity around said section to form a first negative unit with a mating face at said inner wall of the cavity and corresponding with the mating face of the first section and with a frame-locating edge formed by said frame, positioning the other of said negative sections within a removable frame contacting said locating edge of said first negative unit and forming a cavity outwardly of the first unit with the mating face of the second negative section in registration with that of the first section at said mating face of the first negative unit, casting back-up material in said last-named cavity around the second negative section to form a second negative unit registering with the first negative unit and having a mating face in contact with the mating face of the first unit and a frame-locating edge formed by said frame which is in alignment with the frame locating edge on said first negative unit, enclosing each of said negative units separately within a similar removable frame contacting the frame-locating edge thereof with the mating face of the negative unit exposed and with the frame forming a cavity outwardly thereof, and casting pattern-forming material in said last-named frame cavity in contact with the said mating face of said negative unit to form the positive pattern with a mating face formed by said negative unit and a locating edge formed by said frame, and removing the frame to expose the locating edge of said positive pattern.

2. A process for forming a production pattern from a master pattern which comprises forming cope and drag negative sections with mating faces from the master pattern, providing a template of predetermined size and outline and a peripheral frame-locating edge in engagement with a locating surface, placing a removable material-confining frame of suitable depth around the template in contact with the peripheral locating edge thereof and in contact with said locating surface, removing the template to provide a material-receiving cavity within the frame, positioning one of said negative sections within the frame cavity with its mating face in contact with said locating surface, casting back-up material in the frame cavity around said negative section in contact with said locating surface to form a first negative unit with its mating face formed by contact with said surface and a peripheral frame-locating edge formed by contact with said frame, positioning the other of said negative sections within a similar removable frame contacting with said locating edge of said first negative unit and forming a cavity outwardly of the first unit and with the mating face of the second negative section in registration with that of the first negative section at said mating face of the first negative unit, casting back-up material in said last-named frame cavity around the second negative section to form a second negative unit registering with the first negative unit and having a mating face in contact with the mating face of the first unit and a frame-locating peripheral edge formed by said last-named frame which is in alignment with the locating edge on said first negative unit, enclosing each of said negative units separately within a similar removable frame contacting the frame-locating edge thereof with the mating face of the negative unit exposed and with the frame forming a cavity outwardly thereof, and casting pattern-forming material in said last-named frame cavity in contact with the said mating face of said negative unit to form the positive pattern with a mating face formed by said negative unit and a locating edge formed by said frame, and removing the frame to expose the locating edge of said positive pattern.

3. A process for forming a production pattern from a master pattern which comprises forming cope and drag negative sections with mating faces from the master pattern, providing a template of predetermined size and outline and a peripheral frame-locating edge in engagement with a locating surface, placing a removable material-confining frame of suitable depth around the template in contact with the peripheral locating edge thereof and in contact with said locating surface to provide a material-receiving cavity within the frame, positioning one of said negative sections within the frame cavity with its mating face in contact with the exposed face of the template, casting back-up material in the frame cavity around said negative section in contact with the said face of the template to form a first negative unit with its mating face formed by contact with said template face and a peripheral frame-locating edge formed by contact with said frame, positioning the other of said negative sections within a similar removable frame contacting with said locating edge of said first negative unit and forming a cavity outwardly of the first unit and with the mating face of the second negative section in registration with that of the first negative section at said mating face of the first negative unit and without the template, casting back-up material in said last-named frame cavity around the second negative section to form a second negative unit registering with the first negative unit and having a mating face in contact with the mating face of the first unit and a peripheral frame-locating edge formed by said last-named frame which is in alignment with the locating edge on said first negative unit, enclosing each of said negative units separately within a similar removable frame contacting the frame-locating edge thereof with the mating face of the negative unit exposed and with the frame forming a cavity outwardly thereof, and casting pattern-forming material in said last-named frame cavity in contact with the said mating face of said negative unit to form the positive pattern with a mating face formed by said negative unit and a locating edge formed by said frame, and removing the frame to expose the locating edge of said positive pattern.

4. A process for producing a production pattern from a master pattern which comprises forming cope and drag negative sections with mating faces from the master pattern, providing a template of predetermined size, outline and thickness with a peripheral frame-locating edge on a flat supporting surface, placing a removable material-confining frame of a depth equal to twice that of the template thickness around the template in contact with the peripheral locating edge thereof and with said flat surface to provide a material-receiving cavity within the frame, positioning one of said negative sections within the frame cavity with its mating face in contact with the exposed face of the template, casting back-up material in the frame cavity around said negative section in contact with the said face of the template and leveling it with the upper edge of the frame to form a first negative unit with its mating face formed by contact with said template face and with a peripheral frame-locating edge formed by contact with said frame of a thickness corresponding to that of the template, positioning the other of said negative sections within a similar removable frame contacting with said locating edge of said first negative unit and forming a cavity thereabove and with its mating face in registration with that of the first negative section at said mating face of the first negative unit and without the template, casting back-up material in said last-named frame cavity around the second negative section and leveling it with the upper edge of the frame to form a second negative unit registering with the first negative unit and having a mating face in contact with the mating face of the first unit and a peripheral frame-locating edge formed by said frame which is in alignment with the locating edge on said first negative unit and is of a thickness corresponding to that of the template, enclosing each of said negative units separately within a similar removable frame contacting the frame-locating edge thereof with the mating face of the negative unit upwardly and with the frame forming a cavity thereabove and casting pattern-forming material in said last-named frame cavity on said negative unit in contact with the said mating face thereof and leveling it with the upper edge of the frame to form the positive pattern with a mating face formed by said negative unit and a locating edge formed by said frame of a thickness corresponding to that of the template, and removing the frame to expose the locating edge of said positive pattern.

5. A process for producing a production pattern from a master pattern which comprises forming cope and drag negative sections with mating faces from the master pattern, providing a template of predetermined size, outline and thickness with a peripheral frame-locating edge on a flat supporting surface with one face exposed, placing a removable material-confining frame of a depth equal to twice that of the template thickness around the template in contact with the peripheral locating edge thereof and securing it to the template to provide a material-receiving cavity within the frame, positioning one of said negative sections within the frame cavity with its mating face in contact with the exposed face of the template, casting back-up material in the frame cavity around said negative section in contact with said face of the template and leveling it with the upper edge of the frame to form a first negative unit secured to said frame with its mating face formed by contact with said template face and with a peripheral frame-locating edge formed by contact with said frame of a thickness corresponding to that of the template, removing the template from the frame, positioning the other of said negative sections in the cavity formed by removal of said template from the frame with the mating face of such negative section in registration with that of the first section at said mating face of the first negative unit, casting back-up material in said last-named frame cavity around the second negative section to form a second negative unit secured to said frame and registering with the first negative unit and having a mating face in contact with the mating face of the first unit and a peripheral frame-locating edge formed by said frame of a thickness corresponding to that of the template and which is in alignment with the locating edge on said first negative unit, removing one of said negative units from the connected frame to provide a positive-forming cavity within the frame above the remaining negative unit, enclosing the removed negative unit within a similar removable frame to which it is secured with a positive forming cavity above the exposed mating face thereof, and casting pattern-forming material in each positive-forming cavity in said frames on the negative unit therein in contact with the said mating face thereof to form the positive pattern with a mating face formed by said negative unit and with a locating edge formed by said frame of a thickness corresponding to that of the template, and removing the frame to expose the locating edge of said positive pattern.

References Cited in the file of this patent

UNITED STATES PATENTS

| | | |
|---|---|---|
| 2,399,373 | Miller | Apr. 30, 1946 |
| 2,420,756 | Miller | May 20, 1947 |
| 2,448,827 | Reder | Sept. 7, 1948 |
| 2,846,742 | Wagner | Aug. 12, 1958 |
| 2,947,046 | Wiedmann | Aug. 2, 1960 |